United States Patent [19]

Phipps

[11] 4,306,870
[45] Dec. 22, 1981

[54] CONTACT-ACTUATED LIGHT PENCIL

[75] Inventor: Cornelius M. Phipps, Glen Ellyn, Ill.

[73] Assignee: Plastic Specialties, Inc., Glen Ellyn, Ill.

[21] Appl. No.: 184,011

[22] Filed: Sep. 4, 1980

[51] Int. Cl.³ .............................................. G09B 7/00
[52] U.S. Cl. ..................................................... 434/341
[58] Field of Search ......................................... 434/341

[56] References Cited

U.S. PATENT DOCUMENTS 2,546,666 3/1951 Fleischer ............................ 434/341
3,818,610 6/1974 Baba et al. ........................ 434/341

Primary Examiner—William H. Grieb
Attorney, Agent, or Firm—Darbo & Vandenburgh

[57] ABSTRACT

A contact-actuated light pencil for use in detecting electrically conducting areas or materials. The light pencil includes a hollow pencil body having an aperture at one end, a tubular electrical contact at the one end which lines the aperture, and a conducting probe extending from within the pencil body through the tubular electrical contact. The probe is electrically isolated from direct contact with the tubular electrical contact by an insulator, situated within the electrical contact, which has an internal aperture for through-passage of the probe. The probe is slidably situated within the internal aperture and is resiliently biased by a spring such that a portion of the probe normally extends outside of the pencil body. A conducting path leads between the electrical contact and the probe and includes a battery and lamp which is illuminated when electrical current flows. When a conducting material is simultaneously contacted between the probe and the electrical contact, a circuit is completed and current flows through the conducting path, illuminating the lamp to give usual indication that conducting material has been encountered.

1 Claim, 9 Drawing Figures

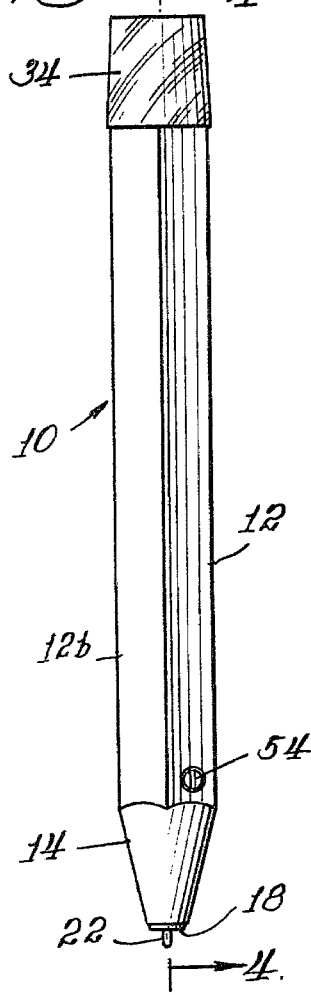
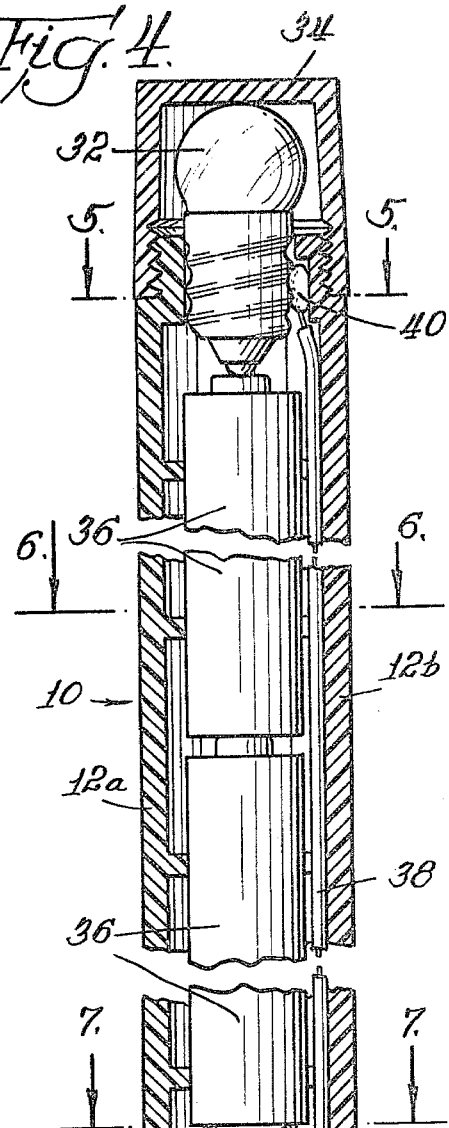
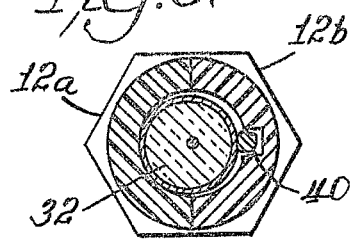
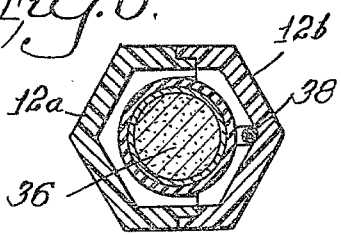
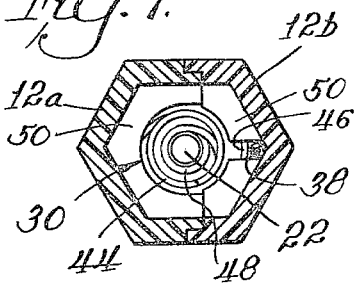
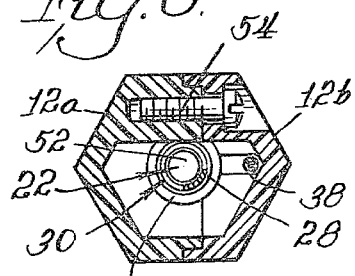
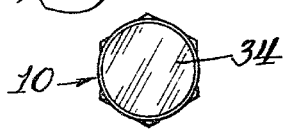
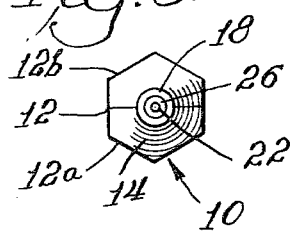
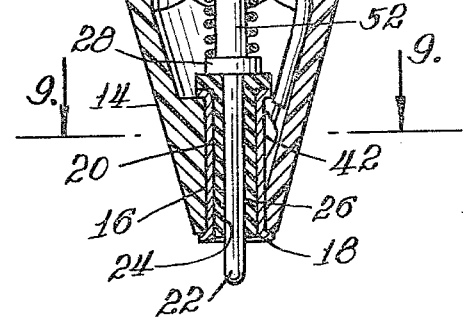

CONTACT-ACTUATED LIGHT PENCIL

BACKGROUND OF THE INVENTION

This invention pertains to devices for indicating the presence of an electrically conductive material, and in particular to a contact-actuated light pencil which, when pressed against a conductive material, gives indication of the presence of the conductive material by illumination of a lamp situated within the light pencil.

A self-contained light pencil is a convenient means with which one can determine the presence of an electrically conducting material. Typically, such a light pencil can be used as a learning aid for self-testing. A simple example will suffice. If one were presented with the multiple choice statement:

A bird can
 a. fly. [ ]
 b. swim. [ ]
 c. run. [ ]

and if the answer square following answer "a" were electrically conductive and the answer squares following answers "b" and "c" were nonconductive, then an individual using the light pencil can easily test himself. Were he to select answer "a" by touching the contiguous square with the light pencil, the light contained within the light pencil will be illuminated because the light pencil has contacted conductive material. However, if he selects either of answers "b" or "c", the light is not illuminated and he immediately realizes that he has selected an incorrect response.

SUMMARY OF THE INVENTION

The invention provides a simple, inexpensive contact-actuated light pencil for detecting the presence of an electrically conductive material, and has particular utility for self-testing. The light pencil comprises an elongated, hollow pencil body which has an aperture at one end, an electrical contact at the one end of the pencil body which has a central opening in registration with the aperture, a conducting probe extending from within the pencil body through the aperture and the central opening, and means electrically isolating the probe from contact with the electrical contact. A conducting path leads between the electrical contact and the probe, and includes a source of electrical current and a lamp to evidence flow of electrical current along the path.

The probe is electrically isolated from the electrical contact by means of an insulator extending within the central opening, the insulator having an internal aperture for through-passage of the probe. The probe is slidably situated within the internal aperture and includes a stop to prevent escape of the probe from the light pencil. A spring resiliently biases the stop against the insulator such that a portion of the probe normally extends beyond the pencil body. Thus, the probe is depressible and when the tip of the light pencil containing the probe and electrical contact engages a conductive surface, bridging of the probe and electrical contact by the conductive material completes a circuit, causing the lamp to illuminate to register the presence of the conductive material.

BRIEF DESCRIPTION OF THE DRAWING

The invention is described in greater detail in the following description of the preferred embodiment taken in conjunction with the drawing, in which:

FIG. 1 is a plan elevational view of a contact-actuated light pencil of the invention, FIG. 2 is a top plan view of the light pencil of FIG. 1, FIG. 3 is a bottom plan view of the light pencil of FIG. 1, FIG. 4 is an enlarged, broken cross-sectional illustration of the light pencil taken along lines 4—4 of FIG. 1, FIG. 5 is a cross section taken along lines 5—5 of FIG. 4, FIG. 6 is a cross section taken along lines 6—6 of FIG. 4, FIG. 7 is a cross section taken along lines 7—7 of FIG. 4, FIG. 8 is a cross section taken along lines 8—8 of FIG. 4, and FIG. 9 is a cross section taken along lines 9—9 of FIG. 4.

DESCRIPTION OF THE PREFERRED EMBODIMENT

A contact-actuated light pencil according to the invention is depicted generally at 10 in the drawing. It includes an elongated, hollow pencil body 12 which, as best illustrated in FIGS. 5 through 9, can be composed of two body halves 12a and 12b. The pencil body 12 can be molded from various plastic materials, such as medium impact polystyrene, or can be formed of other materials as desired.

The pencil body 12 includes a tip 14 at one end which has an aperture 16 formed therein. A hollow, tubular electrical contact 18 lines the aperture 16 and is immobily situated therewithin. Where the contact 18 emerges from the aperture 16, it is flanged slightly outwardly on each end, as shown.

The electrical contact 18 has a central opening 20 in registration with the aperture 16, as illustrated. A conducting probe 22 is slidably mounted within an internal aperture 24 of an insulator 26 which is situated within the electrical contact 18. The insulator 26 prevents a direct electrical contact between the electrical contact 18 and the conducting probe 22.

As best illustrated in FIG. 4, the probe 22 is longer than the aperture 16 and extends beyond the tip 14 of the pencil body 12. To prevent escape of the probe 22 from the light pencil 10, the probe 22 includes an integral collar or stop 28 which is normally biased against the insulator 26 by a spring 30.

The purpose of the light pencil 10 is to detect conducting surfaces by electrically bridging the insulated space between the conducting probe 22 and the contact 18. To visually signify a conducting surface, the light pencil 10 is provided with a visual indicator or lamp 32, illustrated in the drawing as a common flashlight bulb. As shown, the lamp 32 is located at the opposite end of the pencil body 12 from the tip 14, and is contained beneath a removable lens 34 which, as illustrated, is threadedly engaged upon the pencil body 12. The lens 34 is transparent or translucent to permit the user to readily tell when the lamp 32 is lit.

To provide a source of electrical current to illuminate the lamp 32, the light pencil 10 includes batteries 36 situated within the hollow pencil body 12. As shown, the batteries 36 are urged into electrical contact with the visual indicator 32 by means of the spring 30.

A conductor or wire 38 leads between the visual indicator 32 and the electrical contact 18. As shown, the wire 38 is soldered at 40 to the visual indicator 32 and at 42 to the electrical contact 18. While the solder connections 40 and 42 provide positive attachment of the wire 38, other, less permanent means of suitable attachment of the wire 38 will be evident to those skilled in the art.

The spring 30 is formed from three integral spring portions 44, 46 and 48. The central portion 46 of the spring 30, being of largest diameter, is immobily captured between annular flanges 50 formed in the pencil body 12. As thus held, the central spring portion 46 provides a base against which the upper spring portion 44 and lower spring portion 48 bear.

The lower spring portion 48 extends over an enlarged extension 52 of the conducting probe 22 and butts against the collar 28. The lower spring portion 48 is normally biased in compression, forcing the collar 28 against the insulator 26. Thus, the lower portion of the probe 22 normally extends externally of the pencil body 12, and is depressible within the pencil body 12 by further compression of the lower spring portion 48.

The upper spring portion 44 bears against the lowermost battery 36. The spring portion 44 typically is biased in compression, thereby forcing the battery 36 upwardly within the pencil body 12, ensuring contact between the upper most battery 36 and the lamp 32.

The spring 30, batteries 36, lamp 32 and conductor 38 form a conducting path leading between the probe 22 and the electrical contact 18. Thus, whenever a conducting material bridges the gap between the probe 22 and the contact 18, a circuit is completed and electrical current will flow within the light pencil 10 and the lamp 32 will be lit.

As illustrated, the removable lens 34 also serves to hold the lamp 32 in place and to hold the upper portions of the pencil body halves 12a and 12b together. To hold the lower portion of the pencil body 12 together, a screw 54 passes through the pencil body half 12b and is threadedly engaged within the pencil body half 12a. The screw 54, which may be self threading, draws the halves 12a and 12b, together as best illustrated in FIG. 8.

When assembled, the light pencil 10 indicates, by illumination of the lamp 32, the presence of a conductive surface bridging the probe 22 and electrical contact 18. Since the probe 22 extends beyond the tip 14 of the pencil body 12 and is depressible into the pencil body 12, orientation of the light pencil 10 above a conducting surface need not be perpendicular. Thus, when held in the hand, the light pencil 10 may be maintained at any orientation such that the surface to be tested simultaneously bridges between the electrical contact 18 and the conducting probe 22. The depressibility of the conducting probe 22 against the compressible lower spring portion 48 provides for a large variety of orientations of the light pencil 10.

While a preferred embodiment of the invention has been illustrated in the drawing and described above, it should be obvious to one skilled in the art that various changes can be made to the invention without departing from the spirit thereof or scope of the following claims.

What is claimed is:

1. A contact-actuated light pencil comprising
   a. an elongated, pencil-like body having a hollow interior, and having a pair of spaced, annular flanges extending into said hollow interior near one end of said body,
   b. a battery situated within said hollow interior,
   c. an aperture at one end of said body,
   c. an electrical contact at said one end of said body and having a central opening coaxially aligned with said aperture,
   e. a conducting probe extending from within said body through said aperture and said central opening and coaxial therewith, said probe having a stop to prevent exit of said probe from said body,
   f. an insulator extending within said central opening for insulating said probe from direct connection to said electrical contact, said insulator having an internal aperture for throughpassage of said probe,
   g. a lamp at the other end of said body in electrical contact with said battery,
   h. a wire leading between said lamp and said electrical contact, and
   i. an electrically conductive spring extending between said battery and said probe, said spring having
      i. an enlarged central portion immobily mounted between said flanges formed in said body,
      ii. an upper spring portion extending from said central portion and bearing against said battery to urge said battery into contact with said lamp, and
      iii. a lower spring portion extending from said central portion and bearing against said stop to urge said stop against said insulator.

* * * * *